US012464590B2

(12) United States Patent
Ahmad et al.

(10) Patent No.: US 12,464,590 B2
(45) Date of Patent: Nov. 4, 2025

(54) RADIO ACCESS TECHNOLOGY SWITCHING BASED ON NETWORK SUPPORT

(71) Applicant: QUALCOMM INCORPORATED, San Diego, CA (US)

(72) Inventors: Sohrab Ahmad, Hyderabad (IN); Bhanu Kiran Janga, Hyderabad (IN); Osama Lotfallah, San Diego, CA (US); Abhishek Bhatnagar, San Diego, CA (US); Quanling Zhang, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 17/997,088

(22) PCT Filed: Jun. 21, 2020

(86) PCT No.: PCT/CN2020/097306
§ 371 (c)(1),
(2) Date: Oct. 25, 2022

(87) PCT Pub. No.: WO2021/258231
PCT Pub. Date: Dec. 30, 2021

(65) Prior Publication Data
US 2023/0189371 A1  Jun. 15, 2023

(51) Int. Cl.
*H04W 76/18* (2018.01)
(52) U.S. Cl.
CPC .................. *H04W 76/18* (2018.02)
(58) Field of Classification Search
CPC ..... H04W 76/18; H04W 48/18; H04W 88/06; H04W 76/15

(Continued)

(56) References Cited

U.S. PATENT DOCUMENTS

2014/0126552 A1  5/2014  Dayal et al.
2015/0004966 A1*  1/2015  Ayleni .................. H04W 48/16
                                              455/433

(Continued)

FOREIGN PATENT DOCUMENTS

CN       104782213 A    7/2015
CN       105723798 A    6/2016

(Continued)

OTHER PUBLICATIONS

International Search Report and Written Opinion—PCT/CN2020/097306—ISA/EPO—Mar. 24, 2021.

(Continued)

*Primary Examiner* — Huy C Ho
(74) *Attorney, Agent, or Firm* — Holland & Hart LLP

(57) ABSTRACT

Methods, systems, and devices for wireless communications are described. Generally, the described techniques provide for efficiently falling back from one RAT to another RAT while maximizing the services available to a UE. When a request from a UE for communicating with a base station using one RAT is rejected by a network node for unexpected causes, the UE may use the techniques described herein to fallback to an appropriate RAT. For instance, after receiving a response indicating that a request including fifth generation (5G) parameters is rejected, the UE may drop the 5G parameters and fall back to fourth generation (4G), rather than falling back to second generation (2G) or third generation (3G). The unexpected causes may be preconfigured and may be determined based on a number of factors, including a subscription of the UE, a public land mobile network (PLMN) associated with the network node, etc.

30 Claims, 10 Drawing Sheets

(58) Field of Classification Search
USPC .......................................................... 370/328
See application file for complete search history.

(56) References Cited

U.S. PATENT DOCUMENTS

2019/0159157 A1     5/2019  Gupta
2020/0413297 A1*   12/2020  Chiang ................ H04W 76/18

FOREIGN PATENT DOCUMENTS

| CN | 111201810 A     | 5/2020 |
|----|-----------------|--------|
| EP | 3190828 A1      | 7/2017 |
| WO | WO-2014070531   | 5/2014 |
| WO | WO-2018006985 A1| 1/2018 |
| WO | 2019032532 A1   | 2/2019 |
| WO | 2019074325 A1   | 4/2019 |
| WO | WO-2020078374 A1| 4/2020 |

OTHER PUBLICATIONS

Supplementary European Search Report—EP20942245—Search Authority—Berlin—Feb. 9, 2024.

\* cited by examiner

RADIO ACCESS TECHNOLOGY SWITCHING BASED ON NETWORK SUPPORT

CROSS REFERENCE

The present Application is a 371 national stage filing of International PCT Application No. PCT/CN2020/097306 by AHMAD et al. entitled "RADIO ACCESS TECHNOLOGY SWITCHING BASED ON NETWORK SUPPORT," filed Jun. 21, 2020, which is assigned to the assignee hereof, and which is expressly incorporated by reference in its entirety herein

FIELD OF TECHNOLOGY

The following relates generally to wireless communications and more specifically to radio access technology (RAT) switching based on network support.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a UE may support multiple RATs for communicating with one or more base stations. For instance, the UE may support 5G and 4G in addition to second generation (2G) and third generation (3G) for communications with one or more base stations. Improved techniques at a UE for identifying a suitable RAT for communications with a base station may be desirable.

SUMMARY

The described techniques relate to improved methods, systems, devices, and apparatuses that support radio access technology (RAT) selection and communication (e.g., attachment and bearer setup) based on network support. Generally, the described techniques provide for efficiently selecting a RAT (e.g., falling back from one RAT to another RAT) while maximizing the services available to a UE. When a request from a UE for communicating with a base station using one RAT is rejected by a network node for unexpected causes, the UE may use the techniques described herein to select an appropriate RAT. For instance, after receiving a response indicating that a request including fifth generation (5G) parameters is rejected, the UE may drop the 5G parameters and fall back or maintain a connection using a fourth generation (4G) RAT, rather than falling back to second generation (2G) or third generation (3G) RATs. The unexpected causes may be preconfigured and may be determined based on a number of factors, including a subscription of the UE, a public land mobile network (PLMN) associated with the network node, etc. Further, the unexpected causes may include causes for which handling at the UE is undefined.

A method of wireless communication at a UE supporting a first radio access technology and a second radio access technology is described. The method may include establishing a connection with a base station according to the first radio access technology, transmitting, to a first network node via the connection established with the base station, a first request associated with a bearer for a communication service, the first request including parameters associated with the second radio access technology, receiving, from the first network node, a response indicating that the first request is rejected, the response including a rejection cause that is one of a set of preconfigured causes, determining that the second radio access technology is unsupported by the first network node for communications with the UE based on the rejection cause being one of the set of preconfigured causes, and transmitting, to the first network node based on the determining, a second request associated with the bearer for the communication service, the second request exclusive of the parameters associated with the second radio access technology.

An apparatus for wireless communication at a UE supporting a first radio access technology and a second radio access technology is described. The apparatus may include a processor, memory coupled (e.g., operatively, communicatively, functionally, electronically, electrically, etc.) to the processor, and instructions stored in the memory. The instructions may be executable by the processor to cause the apparatus to establish a connection with a base station according to the first radio access technology, transmit, to a first network node via the connection established with the base station, a first request associated with a bearer for a communication service, the first request including parameters associated with the second radio access technology, receive, from the first network node, a response indicating that the first request is rejected, the response including a rejection cause that is one of a set of preconfigured causes, determine that the second radio access technology is unsupported by the first network node for communications with the UE based on the rejection cause being one of the set of preconfigured causes, and transmit, to the first network node based on the determining, a second request associated with the bearer for the communication service, the second request exclusive of the parameters associated with the second radio access technology.

Another apparatus for wireless communication at a UE supporting a first radio access technology and a second radio access technology is described. The apparatus may include means for establishing a connection with a base station according to the first radio access technology, transmitting, to a first network node via the connection established with the base station, a first request associated with a bearer for a communication service, the first request including parameters associated with the second radio access technology, receiving, from the first network node, a response indicating that the first request is rejected, the response including a rejection cause that is one of a set of preconfigured causes, determining that the second radio access technology is unsupported by the first network node for communications with the UE based on the rejection cause being one of the set of preconfigured causes, and transmitting, to the first network node based on the determining, a second request associated with the bearer for the communication service, the second request exclusive of the parameters associated with the second radio access technology.

A non-transitory computer-readable medium storing code for wireless communication at a UE supporting a first radio access technology and a second radio access technology is described. The code may include instructions executable by a processor to establish a connection with a base station according to the first radio access technology, transmit, to a first network node via the connection established with the base station, a first request associated with a bearer for a communication service, the first request including parameters associated with the second radio access technology, receive, from the first network node, a response indicating that the first request is rejected, the response including a rejection cause that is one of a set of preconfigured causes, determine that the second radio access technology is unsupported by the first network node for communications with the UE based on the rejection cause being one of the set of preconfigured causes, and transmit, to the first network node based on the determining, a second request associated with the bearer for the communication service, the second request exclusive of the parameters associated with the second radio access technology.

Some examples of the method, apparatuses, and non-transitory computer-readable medium described herein may further include operations, features, means, or instructions for adding a PLMN associated with the first network node to a list of PLMNs at which the second radio access technology may be unsupported, and refraining from transmitting requests including parameters associated with the second radio access technology to network nodes associated with the PLMN based on adding the PLMN to the list. Some examples of the method, apparatuses, and non-transitory computer-readable medium described herein may further include operations, features, means, or instructions for receiving, from the first network node, a threshold number of responses each including a rejection cause that may be one of the set of preconfigured causes, and transmitting, to the first network node, the second request exclusive of the parameters associated with the second radio access technology based on receiving the threshold number of responses. Some examples of the method, apparatuses, and non-transitory computer-readable medium described herein may further include operations, features, means, or instructions for receiving an indication of the threshold number of responses after which the UE may be to transmit the second request.

Some examples of the method, apparatuses, and non-transitory computer-readable medium described herein may further include operations, features, means, or instructions for determining that the second radio access technology is unsupported by the first network node based on a subscription of the UE with an operator having a relationship to a PLMN associated with the first network node. In some examples of the method, apparatuses, and non-transitory computer-readable medium described herein, the preconfigured causes include rejection causes for which handling at the UE may be undefined. In some examples of the method, apparatuses, and non-transitory computer-readable medium described herein, the preconfigured causes include one or more of a first cause indicating that the base station may be unable to derive an identity of the UE, a second cause indicating that evolved packet system (EPS) services may be not allowed in a PLMN associated with the first network node, and a third cause indicating a protocol error. In some examples of the method, apparatuses, and non-transitory computer-readable medium described herein, the first request and second request include attach requests or tracking area update requests.

A method of wireless communication at a UE supporting a first radio access technology and a second radio access technology is described. The method may include establishing a first connection with a first base station according to the second radio access technology, transmitting, to a first network node via the first connection with the first base station, a first request associated with a bearer for a communication service, the first request including parameters associated with the second radio access technology, receiving, from the first base station, a response indicating that the first request is rejected, the response including a rejection cause that is one of a set of preconfigured causes, determining that the second radio access technology is unsupported by the first network node for communications with the UE based on the rejection cause being one of the set of preconfigured causes, establishing, based on the determining, a second connection with the first base station or a second base station according to the first radio access technology, and transmitting, via the second connection with the first base station or the second base station, a second request associated with the bearer for the communication service to the first network node or a second network node, the second request exclusive of the parameters associated with the second radio access technology based on the determining.

An apparatus for wireless communication at a UE supporting a first radio access technology and a second radio access technology is described. The apparatus may include a processor, memory coupled (e.g., operatively, communicatively, functionally, electronically, electrically, etc.) to the processor, and instructions stored in the memory. The instructions may be executable by the processor to cause the apparatus to establish a first connection with a first base station according to the second radio access technology, transmit, to a first network node via the first connection with the first base station, a first request associated with a bearer for a communication service, the first request including parameters associated with the second radio access technology, receive, from the first base station, a response indicating that the first request is rejected, the response including a rejection cause that is one of a set of preconfigured causes, determine that the second radio access technology is unsupported by the first network node for communications with the UE based on the rejection cause being one of the set of preconfigured causes, establish, based on the determining, a second connection with the first base station or a second base station according to the first radio access technology, and transmit, via the second connection with the first base station or the second base station, a second request associated with the bearer for the communication service to the first network node or a second network node, the second request exclusive of the parameters associated with the second radio access technology based on the determining.

Another apparatus for wireless communication at a UE supporting a first radio access technology and a second radio access technology is described. The apparatus may include means for establishing a first connection with a first base station according to the second radio access technology, transmitting, to a first network node via the first connection with the first base station, a first request associated with a bearer for a communication service, the first request including parameters associated with the second radio access technology, receiving, from the first base station, a response indicating that the first request is rejected, the response including a rejection cause that is one of a set of preconfigured causes, determining that the second radio access technology is unsupported by the first network node for communications with the UE based on the rejection cause being one of the set of preconfigured causes, establishing, based on the determining, a second connection with the first base station or a second base station according to the first radio access technology, and transmitting, via the second connection with the first base station or the second base station, a second request associated with the bearer for the communication service to the first network node or a second network node, the second request exclusive of the parameters associated with the second radio access technology based on the determining.

A non-transitory computer-readable medium storing code for wireless communication at a UE supporting a first radio access technology and a second radio access technology is described. The code may include instructions executable by a processor to establish a first connection with a first base station according to the second radio access technology, transmit, to a first network node via the first connection with the first base station, a first request associated with a bearer for a communication service, the first request including parameters associated with the second radio access technology, receive, from the first base station, a response indicating that the first request is rejected, the response including a rejection cause that is one of a set of preconfigured causes, determine that the second radio access technology is unsupported by the first network node for communications with the UE based on the rejection cause being one of the set of preconfigured causes, establish, based on the determining, a second connection with the first base station or a second base station according to the first radio access technology, and transmit, via the second connection with the first base station or the second base station, a second request associated with the bearer for the communication service to the first network node or a second network node, the second request exclusive of the parameters associated with the second radio access technology based on the determining.

Some examples of the method, apparatuses, and non-transitory computer-readable medium described herein may further include operations, features, means, or instructions for adding a PLMN associated with the first network node to a list of PLMNs at which the second radio access technology is unsupported, and refraining from transmitting requests including parameters associated with the second radio access technology to network nodes associated with the PLMN based on adding the PLMN to the list. Some examples of the method, apparatuses, and non-transitory computer-readable medium described herein may further include operations, features, means, or instructions for receiving, from the first network node, a threshold number of responses each including a rejection cause that may be one of the set of preconfigured causes, and transmitting, to the first network node or the second network node, the second request including the parameters associated with the first radio access technology based on receiving the threshold number of responses. Some examples of the method, apparatuses, and non-transitory computer-readable medium described herein may further include operations, features, means, or instructions for receiving an indication of the threshold number of responses after which the UE may be to transmit the second request.

In some examples of the method, apparatuses, and non-transitory computer-readable medium described herein, the determining that the second radio access technology may be unsupported by the first network node is based on a subscription of the UE with an operator having a relationship to a PLMN associated with the first network node. In some examples of the method, apparatuses, and non-transitory computer-readable medium described herein, the preconfigured causes include rejection causes for which handling at the UE may be undefined. In some examples of the method, apparatuses, and non-transitory computer-readable medium described herein, the preconfigured causes include one or more of a first cause indicating that the first base station may be unable to derive an identity of the UE, a second cause indicating that evolved packet system (EPS) services may be not allowed in a PLMN associated with the first network node, and a third cause indicating a protocol error. In some examples of the method, apparatuses, and non-transitory computer-readable medium described herein, the first request and second request include attach requests or tracking area update requests.

DETAILED DESCRIPTION

Figure 1:
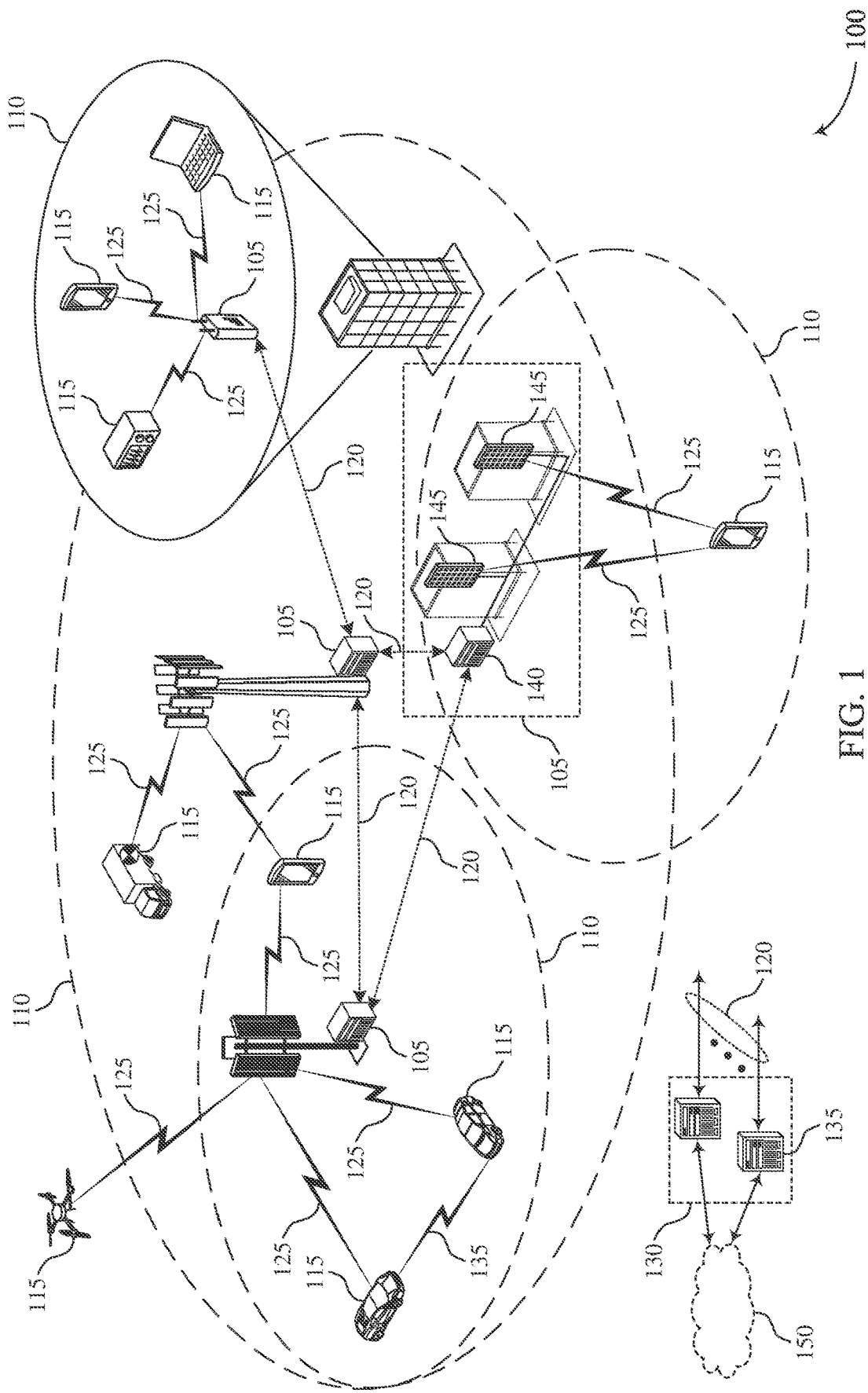
FIG. 1 illustrates an example of a wireless communications system that supports radio access technology (RAT) switching based on network support in accordance with aspects of the present disclosure.

Some wireless communications systems may support multiple radio access technologies (RATs) for communications for UEs. Each RAT may be associated with a level of services offered to UEs and may include fifth generation (5G), fourth generation (4G), third generation (3G), and second generation (2G), listed in decreasing order of the level of services offered to UEs. Thus, 5G may support additional services and may be a desirable RAT for communications between a UE and a base station, while 2G may support limited services and may be used as a fallback when other RATs are unavailable or unsupported. In some wireless communications systems, 2G and 3G may be the fallback options used by a UE when a 4G request from the UE is rejected.

In some cases, a network or portions of a network may support 4G and may not support 5G, but UEs in the network may support both 4G and 5G. For instance, as 5G services are introduced, users may upgrade to UEs supporting 5G faster than operators are able to update networks to support 5G services. In such cases, a UE may transmit a 4G request including 5G parameters in an attempt to indicate capabilities of using 5G (e.g., 5G in a non-standalone (NSA) mode). However, because 5G may be unsupported by the network, the network may not be able to process the 5G parameters, and the request may be rejected by the network due to abnormal or unexpected causes. Since handling for these unexpected causes may be undefined at the UE, the UE may misinterpret the rejection as an inability to use the 4G connection and fall back to 2G or 3G services in a network. That is, since the 4G request was rejected, and 2G and 3G are the fallback options used by the UE when a 4G request is rejected, the UE may fall back to 2G or 3G when the 4G request is rejected. Thus, although the network may support 4G, the 4G request may be rejected if it includes 5G parameters. As such, the UE may downgrade to 2G or 3G, and the additional services offered by 4G may be unavailable to the UE.

As described herein, a wireless communications system may support efficient techniques for RAT selection while maximizing the services available to a UE. In particular, when a UE is rejected by a network node for unexpected causes for communicating with a base station using one RAT, the UE may be configured to use the techniques described herein to continue to use the RAT, or fallback to an appropriate RAT. For instance, after receiving a response indicating that a 4G request with 5G parameters is rejected, the UE may fallback to 4G without the option of 5G support, rather than falling back to 2G or 3G. The unexpected causes may be preconfigured and may be determined based on a number of factors, including a subscription of the UE, a public land mobile network (PLMN) associated with the network node, etc. Further, the unexpected causes may include causes for which handling at the UE is undefined.

Aspects of the disclosure introduced above are described below in the context of a wireless communications system. Examples of processes and signaling exchanges that support RAT switching based on network support are then described. Aspects of the disclosure are further illustrated by and described with reference to apparatus diagrams, system diagrams, and flowcharts that relate to RAT switching based on network support.

FIG. 1 illustrates an example of a wireless communications system 100 that supports RAT switching based on network support in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, an MP3 player, a video device, etc.), a camera, a gaming device, a navigation/positioning device (e.g., GNSS (global navigation satellite system) devices based on, for example, GPS (global positioning system), Beidou, GLONASS, or Galileo, a terrestrial-based device, etc.), a tablet computer, a laptop computer, or a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different RATs.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include one or more network nodes or entities 135. For instance, the core network 130 may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Wireless communications system 100 may support multiple RATs (e.g., 5G, 4G, 3G, and 2G) for communications for UEs 115 (e.g., via base stations 105). In some cases, a network in the wireless communications system 100 may support 4G and may not support 5G, but UEs 115 in the network may support both 4G and 5G. For instance, as 5G services are introduced, users may upgrade to UEs 115 supporting 5G faster than operators are able to update networks to support 5G services. In such cases, a UE 115 may transmit a 4G request with 5G parameters to indicate capabilities of using 5G (e.g., in an NSA mode). However, because 5G may be unsupported by the network, the network may not be able to process the 5G parameters, and the request may be rejected by the network due to abnormal or unexpected causes. That is, the network (e.g., a network node 135) may respond abruptly or unexpectedly since the network may not be capable of managing or processing 5G parameters or information elements (IEs) (e.g., parameters associated with dual connectivity NR (DCNR) or UE extended security capabilities introduced with 5G).

The abnormal or unexpected causes described above may correspond to causes for which handling at a UE 115 is undefined. The handling may be undefined due to an assumption that a network will support 5G if UEs 115 in the network support 5G, or may be undefined under the conditions in which the UE 115 is attempting to establish communication. In one example, in response to a request from a UE 115, the network may indicate that the UE 115 identity cannot be derived by the network (e.g., cause #9). This EPS mobility management (EMM) cause may be sent to the UE 115 when the network cannot derive the identity of the UE 115 from the globally unique temporary UE identity (GUTI), serving temporary mobile subscriber identity (TMSI) (S-TMSI), packet TMSI (P-TMSI), and routing area identification (RAI). For instance, there may be no matching identity context in the network or the network may fail to validate the identity of the UE 115 due to integrity check failure of the received message. For an attach procedure, however, this cause may be unexpected since an attach request may be a first registration message transmitted to a network node 135, and it is expected that the MME will not have the UE identity saved before the first registration.

In another example, a network node 135 in the network may indicate that EPS services are not allowed in a PLMN linked to the network node 135 (e.g., cause #14). This EMM cause may be sent to the UE 115 that transmits a request (e.g., requests service), or if the network initiates a detach request in a PLMN which does not offer roaming for EPS services to the UE 115. In a home PLMN, however, this cause may be unexpected since the home PLMN should support EPS services. In yet another example, the network node 135 may indicate a protocol error (e.g., cause #111). However, receiving this rejection cause more than once (e.g., for an attach request or tracking area update (TAU) request), or within a home PLMN may also be unexpected.

Since handling for these unexpected causes may be undefined, the UE 115 may simply determine that a 4G request including 5G parameters transmitted to a network is rejected. After a threshold number (e.g., five) of 4G requests from the UE 115 are rejected (e.g., used to register to the network), the UE 115 may disable 4G (e.g., LTE). The UE 115 may then move to circuit switching (CS) RATs like 2G (e.g., global system for mobile communications (GSM)) or 3G (e.g., wideband code division multiple access (WCDMA)). Thus, although a network may support 4G, the 4G requests from the UE may be rejected if the requests include 5G parameters. As such, the UE 115 may downgrade to 2G or 3G, and the additional services offered by 4G may be lost (e.g., resulting in data disruption). Further, in some cases, if an operator fails to support 2G or 3G (e.g., as a fallback), the UE 115 may not get any service (e.g., resulting in no data transfer when the 4G requests from the UE 115 are continuously rejected by the network). The chances of a UE 115 transmitting requests that cannot be handled by a network may also be increased when the UE 115 is roaming (e.g., transfers to a roaming PLMN).

As an example, a UE 115 may transmit an initial attach request to a PLMN, and the PLMN may transmit a response to the UE 115 indicating that the request is rejected because the UE 115 identity cannot be derived by the PLMN (e.g., cause #9). Similarly, a TAU request may be rejected by the network for the same cause (e.g., upon change in tracking area or after intra-RAT or inter-RAT handover from a CS domain to a PS domain in the same PLMN). The rejected TAU request may trigger an attach procedure by the UE 115, and the UE 115 may receive a response to the attach request indicating that the request is rejected because EPS services are not allowed in the PLMN (e.g., cause #14). Thus, the UE 115 may only receive CS services from the network (e.g., 2G or 3G). Further, the rejections received from the network may be non-integrity protected and a denial of service (DoS) feature may be disabled. As described herein, wireless communications system 100 may support efficient techniques for selecting a RAT (e.g., falling back from one RAT to an appropriate RAT) while maximizing the services available to a UE 115.

Figure 2:
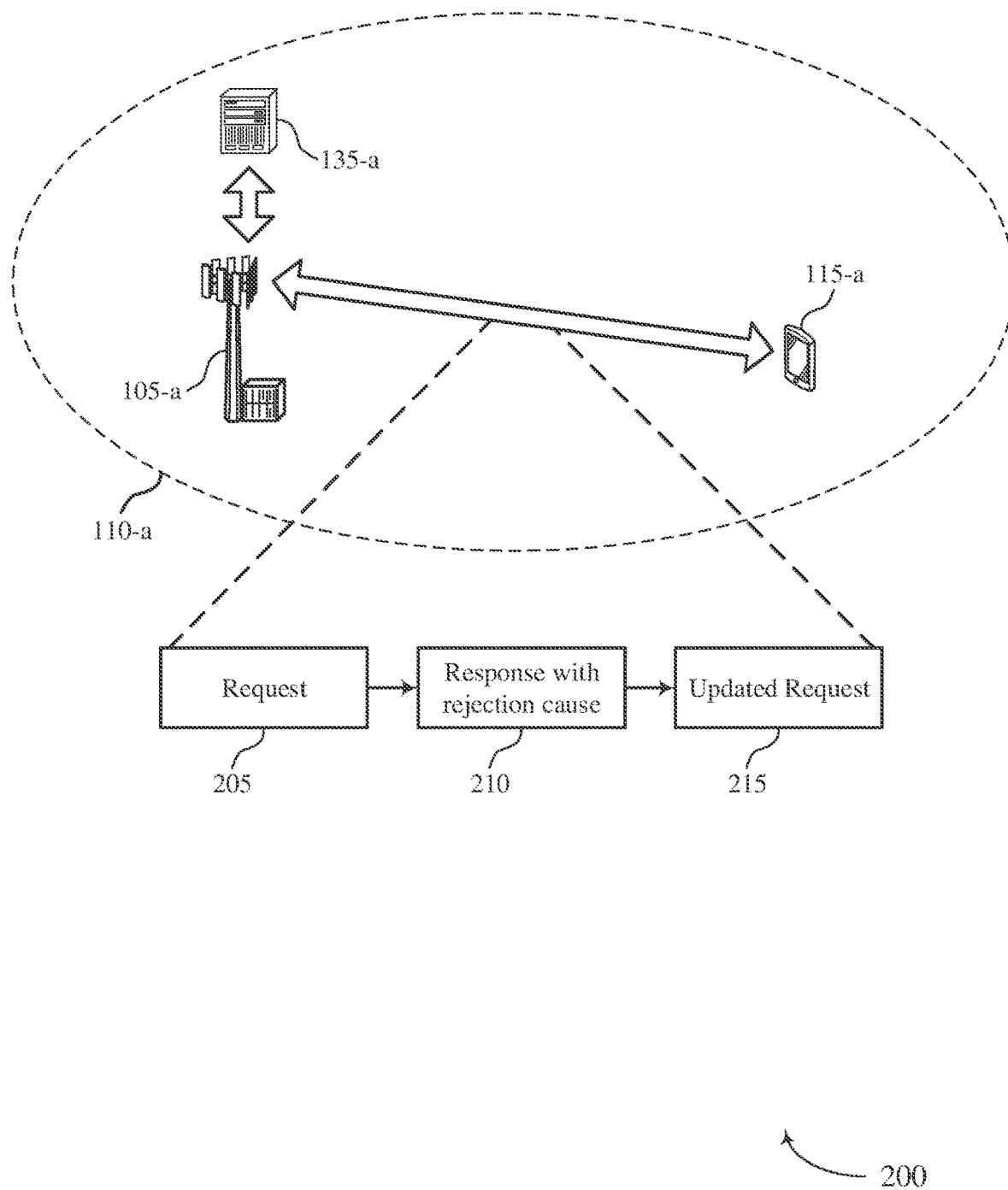
FIG. 2 illustrates an example of a wireless communications system that supports RAT switching based on network support in accordance with aspects of the present disclosure.

FIG. 2 illustrates an example of a wireless communications system 200 that supports RAT switching based on network support in accordance with aspects of the present disclosure. The wireless communications system 200 includes a UE 115-a, which may be an example of a UE 115 described with reference to FIG. 1. The wireless communications system 200 also includes a base station 105-a, which may be an example of a base station 105 described with reference to FIG. 1. The wireless communications system 200 also includes a network node 135-a, which may be an example of a network node 135 described with reference to FIG. 1. The base station 105-a may provide communication coverage for a coverage area 110-a. The wireless communications system 200 may implement aspects of wireless communications system 100. For example, the wireless communications system 200 may support efficient techniques for falling back from one RAT to an appropriate RAT while maximizing the services available to the UE 115-a.

In the example of FIG. 2, the UE 115-a may identify a set of preconfigured causes with which a request may be rejected by the network node 135-a. The UE 115-a may identify the set of preconfigured causes based on a subscription of the UE 115-a with an operator having a relationship to a PLMN associated with the network node 135-a. The preconfigured causes may correspond to unexpected causes for which handling at the UE 115-a is undefined (e.g., abnormal causes which are not generally seen or are not expected as part of a list of attach reject causes or TAU reject causes). In some cases, the base station 105-a may signal the set of preconfigured causes to the UE 115-a. In other cases, the base station 105-a may signal, to the UE 115-a, instructions for handling a set of causes, and the UE 115-a may determine that all other causes are in the set of preconfigured causes. Thus, the UE 115-a may identify the preconfigured causes based on signaling from the base station 105-a, independent of signaling from the base station 105-a, or some combination thereof.

Once the UE 115-a determines that a threshold number of requests are rejected by the network 135-a, and each rejection indicates one of the preconfigured causes, the UE 115-a may use the techniques described herein to fallback to an appropriate RAT. For instance, the UE 115-a may support communications with a first RAT (e.g., 4G) and a second RAT (e.g., 5G), and the UE 115-a may transmit a request 205 (e.g., attach request, TAU request, or other request) to network node 135-a (e.g., via the base station 105-a) with parameters associated with the second RAT. The UE 115-a may then receive a response 210 indicating that the request is rejected with a specified rejection cause. In this example, the UE 115-a may determine that the rejection cause is in the preconfigured set of rejection causes. Accordingly, the UE 115-a may determine that the second RAT is unsupported by the network node 135-a (e.g., if a threshold number of requests have been rejected for the preconfigured causes), and the UE 115-a may transmit an updated request 215 to the network node 135-a or to a different network node 135 (not shown) without parameters associated with the second RAT.

Using these techniques, the UE 115-a may maximize the services available to the UE 115-a since the UE 115-a may avoid downgrading to a third (e.g., 3G) or fourth RAT (e.g., 2G) offering less services than the first RAT. The threshold number of requests described above (e.g., consecutive requests for the same PLMN) may be configured to be less than a threshold number of requests after which the UE 115-a is to fall back to other RATs (e.g., the third or fourth RATs). For instance, if the UE 115-a is configured to fall back to the other RATs after five requests are rejected, the UE 115-a may be configured to drop parameters associated with the second RAT after three requests. As such, the UE 115-a may attempt at least some requests (e.g., two requests) with parameters associated with the first RAT and without parameters associated with the second RAT. In some cases, the UE 115-a may receive an indication of the threshold number of requests from the base station 105-a. In other cases, the UE 115-a may be configured to identify the threshold number of requests independent of signaling from the base station 105-a.

In some cases, once the threshold number of requests from the UE 115-a are rejected by the network node 135-a for the preconfigured causes, and the UE 115-a decides to transmit subsequent requests without parameters associated with the second RAT, the UE 115-a may also add a PLMN associated with the network node 135-a to a list of barred PLMNs. In such cases, the UE 115-a may avoid transmitting requests with parameters associated with the second RAT to any network node associated with a PLMN in the list of barred PLMNs. The list of barred PLMNs may be maintained for NSA cells (e.g., list of barred PLMN of 5G NSA capability), and a maximum number of entries for the list may be configured (e.g., set to some value X). Further, communications with other equivalent PLMNs (ePLMNs) and equivalent home PLMNs (EHPLMNs) may not be affected (e.g., these PLMNs may not be added to the list of barred PLMNs). The list of barred PLMNs (e.g., for 5G NSA capability) may be removed upon reboot (e.g., during a power cycle) or upon universal subscriber identity module (USIM) removal. In some examples, low power mode (LPM) may not be considered as another reset condition (e.g., the list may not be removed upon entering LPM).

Figure 3:
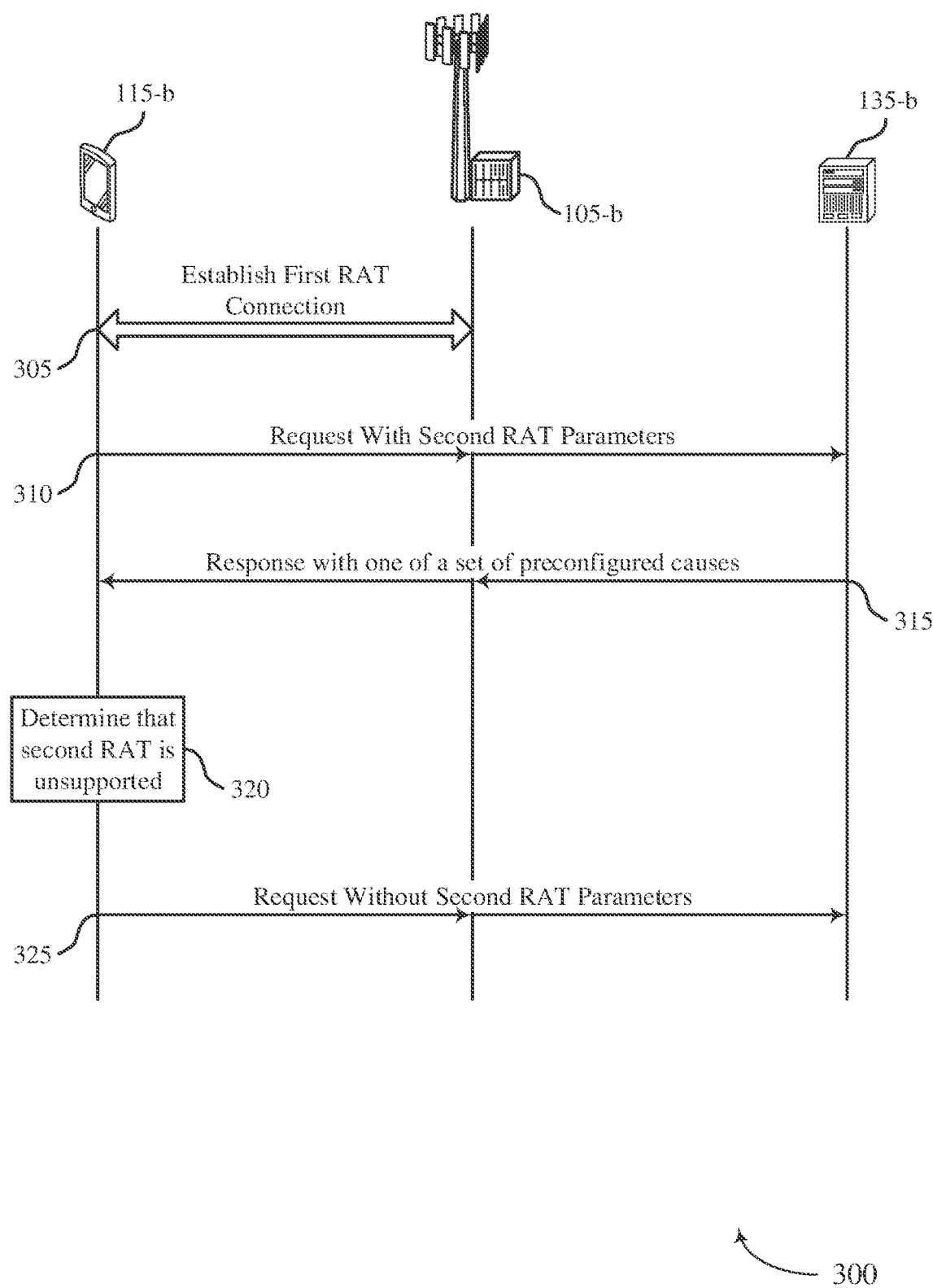
FIGS. 3 and 4 illustrate examples of process flows that support RAT switching based on network support in accordance with aspects of the present disclosure.

FIG. 3 illustrates an example of a process flow 300 that supports RAT switching based on network support in accordance with aspects of the present disclosure. Process flow 300 illustrates aspects of techniques performed by a UE 115-b, which may be an example of a UE 115 described with reference to FIGS. 1 and 2. Process flow 300 also illustrates aspects of techniques performed by a base station 105-b, which may be an example of a base station 105 described with reference to FIGS. 1 and 2. Process flow 300 may support efficient techniques for falling back from one RAT to an appropriate RAT while maximizing the services available to the UE 115-b. In the example of FIG. 3, the UE 115-b may support communications according to a first RAT (e.g., 4G) and a second RAT (e.g., 5G).

At 305, the UE 115-b may establish a connection with the base station 105-b according to the first RAT (e.g., may perform a random access procedure and establish an RRC connection via a cell associated with the first RAT). At 310, the UE 115-b may transmit, to the network node 135-b via the connection established with the base station 105-b, a first request associated with a bearer for a communication service. The first request may be, for example, an attach request sent in an RRC setup complete message. The first request may include parameters associated with the second RAT. At 315, the UE 115-b may receive, from the first network node 135-a, a response indicating that the first request is rejected, where the response includes a rejection cause that is one of a set of preconfigured causes. The preconfigured causes may include rejection causes for which handling at the UE 115-b is undefined. For instance, the preconfigured causes may include a first cause indicating that the base station 105-b or network node 135-b is unable to derive an identity of the UE 115-b (e.g., cause #9), a second cause indicating that EPS services are not allowed in a PLMN associated with the network node 135-b (e.g., cause #14), or a third cause indicating a protocol error (e.g., cause #111).

At 320, the UE 115-b may determine that the second RAT is unsupported by the network node 135-b for communications with the UE 115-b based on the rejection cause being one of the set of preconfigured causes. In particular, the UE 115-b may determine that a threshold number of requests have been rejected for one of the set of preconfigured causes (e.g., if the UE 115-b receives N consecutive attach or TAU rejections with causes #9, #14, or #111 for the same LTE PLMN). Thus, At 325, the UE 115-b may transmit, to the network node 135-*b* based on the determining, a second request associated with the bearer for the communication service, where the second request is exclusive of the parameters associated with the second RAT. The threshold number of requests may be configurable (e.g., via signaling from the base station 105-*b* to the UE 115-*b*) or may be preconfigured at the UE 115-*b*. Further, the threshold number of requests may have a default value (e.g., 3) which may also be configurable (e.g., via signaling from the base station 105-*b* to the UE 115-*b*) or may be preconfigured at the UE 115-*b*.

The UE 115-*b* may also add a PLMN associated with the network node 135-*b* to a list of PLMNs at which the second RAT is unsupported, and the UE 115-*b* may refrain from transmitting requests with parameters associated with the second RAT to network nodes associated with the PLMN. In some cases, if the UE 115-*b* is roaming into a PLMN (e.g., visited PLMN (VPLMN)), and an attach or TAU request is rejected with cause #14, the UE 115-*b* may disable previously specified behavior of adding the PLMN to a list of forbidden PLMNs for GPRS services. Further, in some cases, the UE 115-*b* may be configured with a list of PLMNs to which to apply the techniques described herein (e.g., the event detection algorithm). If the list of PLMNs includes a PLMN associated with the network node 135-*b*, the UE 115-*b* may drop parameters associated with the second RAT after a threshold number of requests that include such parameters are rejected for one of the set of preconfigured causes. If the list of PLMNs is empty or does not include the PLMN associated with the network node 135-*b*, or if the list of PLMNs is not configured, the behavior described herein may be disabled (e.g., the UE 115-*b* may not drop parameters associated with the second RAT after receiving a threshold number of rejections for preconfigured causes).

Once the network node 135-*b* receives the second request, the network node 135-*b* may successfully process the parameters included in the second request and may accept or approve the request. For example, if the first and second requests are attach requests, the UE 115-*b* may successfully perform the attach procedure and the network node 135-*b* may set up the appropriate bearers for providing communication service for the UE 115-*b* via the network (e.g., via network node 135-*b* or other network nodes such as packet data network gateways). Alternatively, if the first and second requests are TAU requests, the UE 115-*b* may successfully receive a TAU from the base station 105-*b*.

Figure 4:
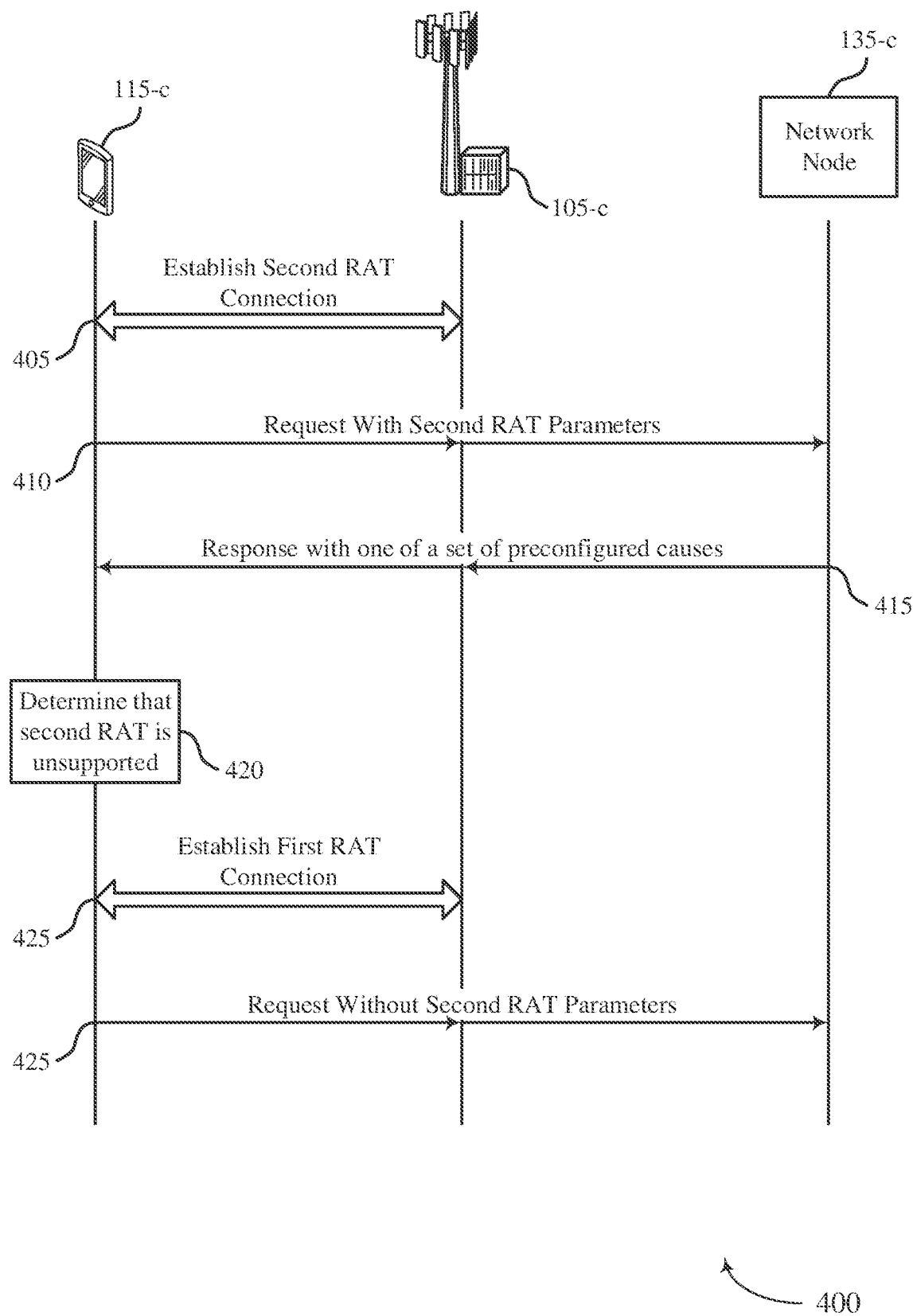

FIG. 4 illustrates an example of a process flow 400 that supports RAT switching based on network support in accordance with aspects of the present disclosure. Process flow 400 illustrates aspects of techniques performed by a UE 115-*c*, which may be an example of a UE 115 described with reference to FIGS. 1 and 2. Process flow 400 also illustrates aspects of techniques performed by a base station 105-*c*, which may be an example of a base station 105 described with reference to FIGS. 1 and 2. As described herein process flow 400 may support efficient techniques for falling back from one RAT to an appropriate RAT while maximizing the services available to the UE 115-*c*. In the example of FIG. 4, the UE 115-*c* may support communications according to a first RAT (e.g., 4G) and a second RAT (e.g., 5G), and the UE 115-*c* may connect to a standalone (SA) 5G cell at a base station 105-*c*.

At 405, the UE 115-*c* may establish a first connection with the base station 105-*c* (e.g., the SA cell at the base station 105-*c*) according to the second RAT. At 410, the UE 115-*c* may transmit, to the network node 135-*c* via the connection established with the base station 105-*c*, a first request associated with a bearer for a communication service. The first request may be, for example, an attach request sent in an RRC setup complete message. The first request may include parameters associated with the second RAT. At 415, the UE 115-*c* may receive, from the network node 135-*c*, a response indicating that the first request is rejected, where the response includes a rejection cause that is one of a set of preconfigured causes. The preconfigured causes may include rejection causes for which handling at the UE 115-*c* is undefined. For instance, the preconfigured causes may include a first cause indicating that the base station 105-*c* or network node 135-*c* is unable to derive an identity of the UE 115-*c* (e.g., cause #9), a second cause indicating that EPS services are not allowed in a PLMN associated with the network node 135-*c* (e.g., cause #14), or a third cause indicating a protocol error (e.g., cause #111).

At 420, the UE 115-*c* may determine that the second RAT is unsupported by the network node 135-*c* for communications with the UE 115-*c* based on the rejection cause being one of the set of preconfigured causes. In particular, the UE 115-*c* may determine that a threshold number of requests have been rejected for one of the set of preconfigured causes (e.g., if the UE 115-*c* receives N consecutive attach or TAU rejections with causes #9, #14, or #111 for the same LTE PLMN). Thus, at 425, the UE 115-*c* may establish a second connection with the base station 105-*c* or with another base station 105 (not shown) according to the first RAT. For example, the UE 115-*c* may perform a cell search or may otherwise detect a different cell for the second connection. At 430, the UE 115-*c* may then transmit, via the second connection with the base station 105-*c* or the other base station 105, a second request associated with the bearer for the communication service to the network node 135-*c* or to another network node 135, where the second request may be exclusive of the parameters associated with the second RAT. The threshold number of requests may be configurable (e.g., via signaling from the base station 105-*c* to the UE 115-*c*) or may be preconfigured at the UE 115-*c*. Further, the threshold number of requests may have a default value (e.g., 3) which may also be configurable (e.g., via signaling from the base station 105-*c* to the UE 115-*c*) or may be preconfigured at the UE 115-*c*.

The UE 115-*c* may also add a PLMN associated with the network node 135-*c* to a list of PLMNs at which the second RAT is unsupported, and the UE 115-*c* may refrain from transmitting requests with parameters associated with the second RAT to network nodes associated with the PLMN. In the example of FIG. 4, the UE 115-*c* may disable SA communications associated with the second RAT (e.g., SA 5G), and the UE 115-*c* may block the PLMN for 5G SA service. Then, the UE 115-*c* may try for data service over the first RAT (e.g., 4G or LTE). If the UE 115-*c* is roaming into a PLMN (e.g., visited PLMN (VPLMN)), and an attach or TAU request is rejected with cause #14, the UE 115-*c* may disable previously specified behavior of adding the PLMN to a list of forbidden PLMNs for GPRS services.

Additionally, in some cases, the UE 115-*c* may be configured with a list of PLMNs to which to apply the techniques described herein (e.g., the event detection algorithm). If the list of PLMNs includes a PLMN associated with the network node 135-*c*, the UE 115-*c* may drop parameters associated with the second RAT after a threshold number of requests that include such parameters are rejected for one of the set of preconfigured causes. If the list of PLMNs is empty or does not include the PLMN associated with the network node 135-*c*, or if the list of PLMNs is not configured, the behavior described herein may be disabled (e.g., the UE 115-*c* may not drop parameters associated with the second RAT after receiving a threshold number of rejections for preconfigured causes).

Once the network node 135-*c* receives the second request, the network node 135-*c* may successfully process the parameters included in the second request and may accept or approve the request. For example, if the first and second requests are attach requests, the network node 135-*c* may successfully set up bearers for providing communication service for UE 115-*c* within the network (e.g., via network node 135-*c* or other network nodes such as packet data network gateways). In particular, the first connection according to the second RAT may be with a SA cell at the base station 105-*c*, and the second connection according to the first RAT may be with a different cell at the base station 105-*c* (e.g., a cell supporting the first RAT) or another base station 105 (e.g., a cell supporting the first RAT, or where the other base station 105 is associated with a different PLMN, a cell supporting the first RAT or the second RAT). Thus, after the second request, the UE 115-*c* may attach to the different cell at the base station 105-*c* or another base station 105 (e.g., the cell supporting the first RAT). Alternatively, if the first and second requests are TAU requests, the UE 115-*c* may successfully receive tracking area updates from the base station 105-*c*.

Figure 5:
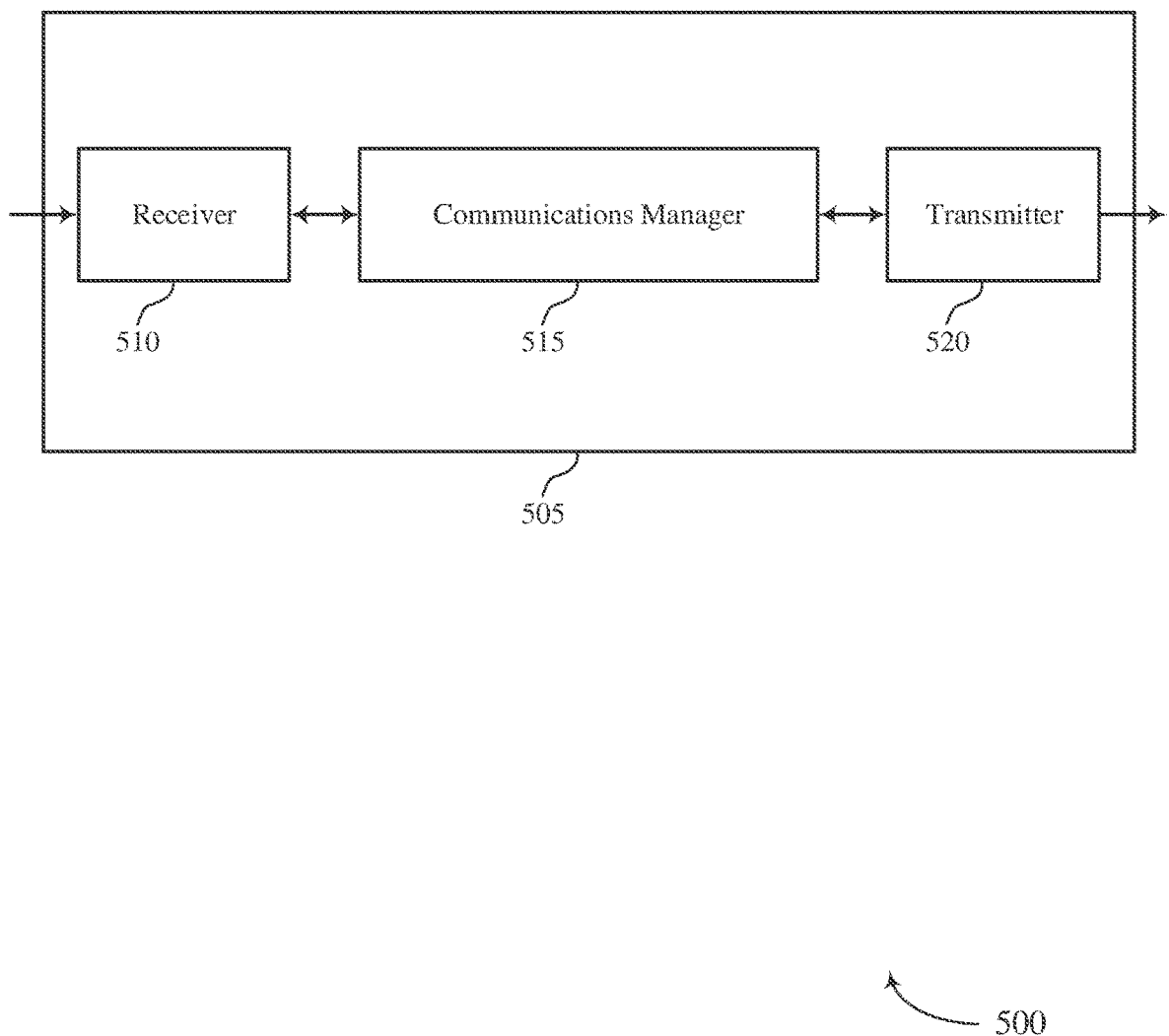
FIGS. 5 and 6 show block diagrams of devices that support RAT switching based on network support in accordance with aspects of the present disclosure.

FIG. 5 shows a block diagram 500 of a device 505 that supports RAT switching based on network support in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to RAT switching based on network support, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may establish a connection with a base station according to the first radio access technology, transmit, to a first network node via the connection established with the base station, a first request associated with a bearer for a communication service, the first request including parameters associated with the second radio access technology, transmit, to the first network node based on the determining, a second request associated with the bearer for the communication service, the second request exclusive of the parameters associated with the second radio access technology, receive, from the first network node, a response indicating that the first request is rejected, the response including a rejection cause that is one of a set of preconfigured causes, and determine that the second radio access technology is unsupported by the first network node for communications with the UE based on the rejection cause being one of the set of preconfigured causes.

The communications manager 515 may also establish a first connection with a first base station according to the second radio access technology, establish, based on the determining, a second connection with the first base station or a second base station according to the first radio access technology, transmit, to a first network node via the first connection with the first base station, a first request associated with a bearer for a communication service, the first request including parameters associated with the second radio access technology, transmit, via the second connection with the first base station or the second base station, a second request associated with the bearer for the communication service to the first network node or a second network node, the second request exclusive of the parameters associated with the second radio access technology based on the determining, receive, from the first base station, a response indicating that the first request is rejected, the response including a rejection cause that is one of a set of preconfigured causes, and determine that the second radio access technology is unsupported by the first network node for communications with the UE based on the rejection cause being one of the set of preconfigured causes. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
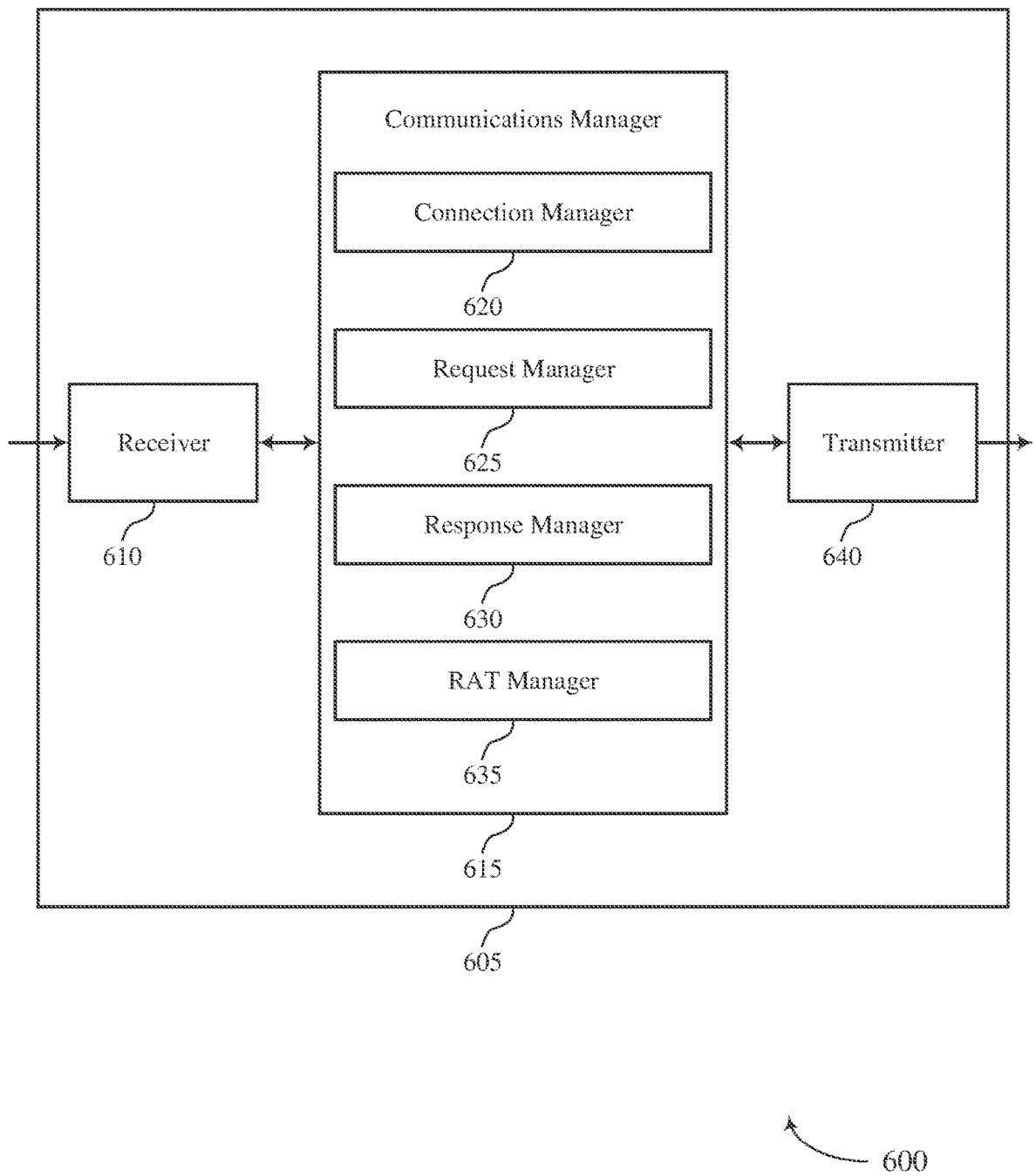

FIG. 6 shows a block diagram 600 of a device 605 that supports RAT switching based on network support in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to RAT switching based on network support, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a connection manager 620, a request manager 625, a response manager 630, and a RAT manager 635. The communications manager 615 may be an example of aspects of the communications manager 810 described herein.

The connection manager 620 may establish a connection with a base station according to the first radio access technology. The request manager 625 may transmit, to a first network node via the connection established with the base station, a first request associated with a bearer for a communication service, the first request including parameters associated with the second radio access technology. The response manager 630 may receive, from the first network node, a response indicating that the first request is rejected, the response including a rejection cause that is one of a set of preconfigured causes. The RAT manager 635 may determine that the second radio access technology is unsupported by the first network node for communications with the UE based on the rejection cause being one of the set of preconfigured causes. The request manager 625 may transmit, to the first network node based on the determining, a second request associated with the bearer for the communication service, the second request exclusive of the parameters associated with the second radio access technology.

The connection manager 620 may establish a first connection with a first base station according to the second radio access technology. The request manager 625 may transmit, to a first network node via the first connection with the first base station, a first request associated with a bearer for a communication service, the first request including parameters associated with the second radio access technology. The response manager 630 may receive, from the first base station, a response indicating that the first request is rejected, the response including a rejection cause that is one of a set of preconfigured causes. The RAT manager 635 may determine that the second radio access technology is unsupported by the first network node for communications with the UE based on the rejection cause being one of the set of preconfigured causes. The connection manager 620 may establish, based on the determining, a second connection with the first base station or a second base station according to the first radio access technology. The request manager 625 may transmit, via the second connection with the first base station or the second base station, a second request associated with the bearer for the communication service to the first network node or a second network node, the second request exclusive of the parameters associated with the second radio access technology based on the determining.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
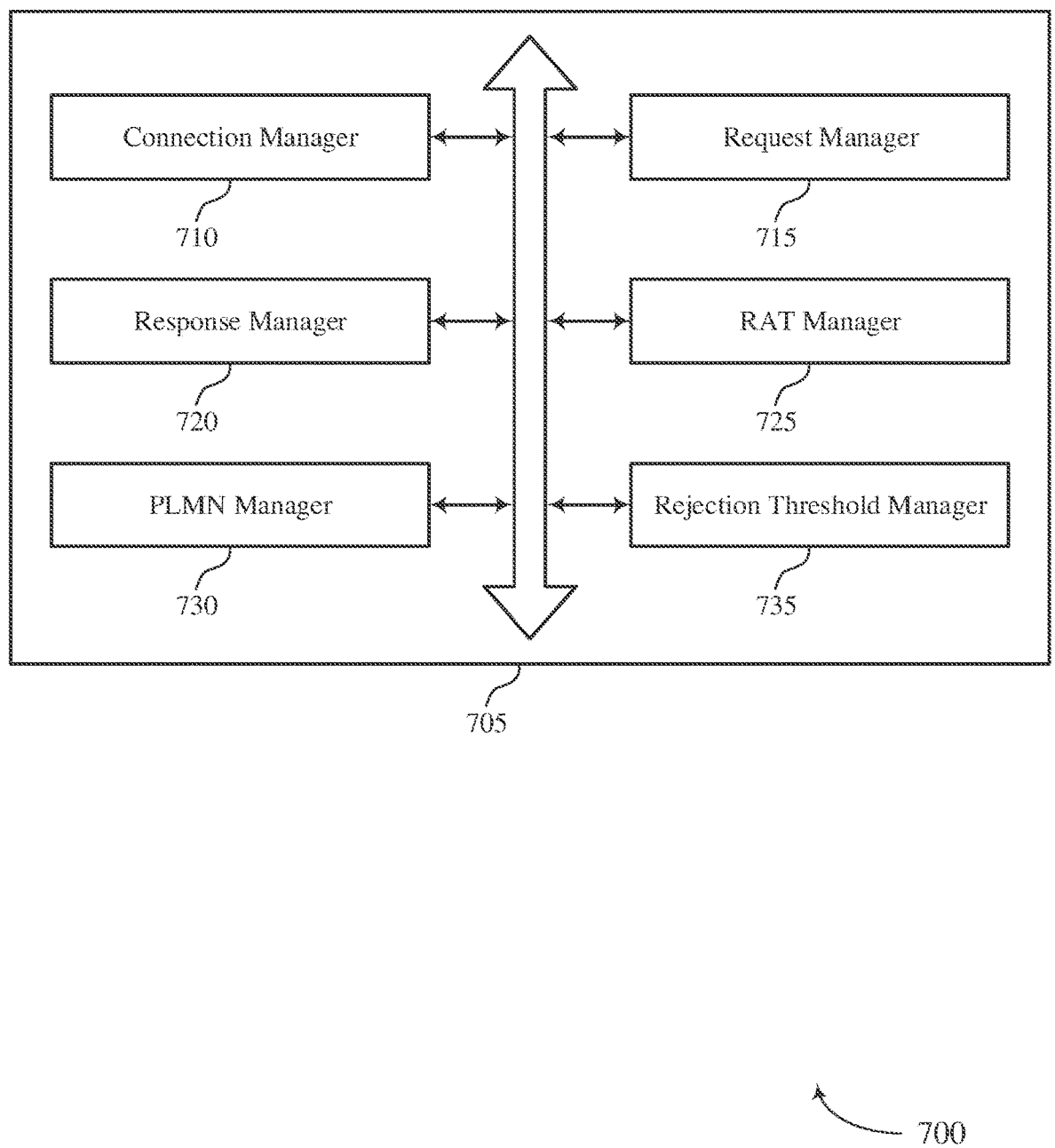
FIG. 7 shows a block diagram of a communications manager that supports RAT switching based on network support in accordance with aspects of the present disclosure.

FIG. 7 shows a block diagram 700 of a communications manager 705 that supports RAT switching based on network support in accordance with aspects of the present disclosure. The communications manager 705 may be an example of aspects of a communications manager 515, a communications manager 615, or a communications manager 810 described herein. The communications manager 705 may include a connection manager 710, a request manager 715, a response manager 720, a RAT manager 725, a PLMN manager 730, and a rejection threshold manager 735. Each of these modules may communicate, directly or indirectly, with one another (e.g., via one or more buses).

The connection manager 710 may establish a connection with a base station according to the first radio access technology. In some examples, the connection manager 710 may establish a first connection with a first base station according to the second radio access technology. In some examples, the connection manager 710 may establish, based on the determining, a second connection with the first base station or a second base station according to the first radio access technology. The request manager 715 may transmit, to a first network node via the connection established with the base station, a first request associated with a bearer for a communication service, the first request including parameters associated with the second radio access technology. In some examples, the request manager 715 may transmit, to the first network node based on the determining, a second request associated with the bearer for the communication service, the second request exclusive of the parameters associated with the second radio access technology.

In some examples, the request manager 715 may transmit, to a first network node via the first connection with the first base station, a first request associated with a bearer for a communication service, the first request including parameters associated with the second radio access technology. In some examples, the request manager 715 may transmit, via the second connection with the first base station or the second base station, a second request associated with the bearer for the communication service to the first network node or a second network node, the second request exclusive of the parameters associated with the second radio access technology based on the determining. In some examples, the request manager 715 may refrain from transmitting requests including parameters associated with the second radio access technology to network nodes associated with the PLMN based on adding the PLMN to the list. In some examples, the request manager 715 may transmit, to the first network node, the second request exclusive of the parameters associated with the second radio access technology based on receiving the threshold number of responses.

In some examples, the request manager 715 may refrain from transmitting requests including parameters associated with the second radio access technology to network nodes associated with the PLMN based on adding the PLMN to the list. In some examples, the request manager 715 may transmit, to the first network node or the second network node, the second request including the parameters associated with the first radio access technology based on receiving the threshold number of responses. In some cases, the first request and second request include attach requests or tracking area update requests. In some cases, the first request and second request include attach requests or tracking area update requests.

The response manager 720 may receive, from the first network node, a response indicating that the first request is rejected, the response including a rejection cause that is one of a set of preconfigured causes. In some examples, the response manager 720 may receive, from the first base station, a response indicating that the first request is rejected, the response including a rejection cause that is one of a set of preconfigured causes. In some cases, the preconfigured causes include rejection causes for which handling at the UE is undefined. In some cases, the preconfigured causes include one or more of a first cause indicating that the base station is unable to derive an identity of the UE, a second cause indicating that evolved packet system (EPS) services are not allowed in a public land mobile network (PLMN) associated with the first network node, and a third cause indicating a protocol error. In some cases, the preconfigured causes include rejection causes for which handling at the UE is undefined. In some cases, the preconfigured causes include one or more of a first cause indicating that the first base station is unable to derive an identity of the UE, a second cause indicating that evolved packet system (EPS) services are not allowed in a public land mobile network (PLMN) associated with the first network node, and a third cause indicating a protocol error.

The RAT manager 725 may determine that the second radio access technology is unsupported by the first network node for communications with the UE based on the rejection cause being one of the set of preconfigured causes. In some examples, the RAT manager 725 may determine that the second radio access technology is unsupported by the first network node for communications with the UE based on the rejection cause being one of the set of preconfigured causes. In some examples, the RAT manager 725 may determine that the second radio access technology is unsupported by the first network node is based on a subscription of the UE with an operator having a relationship to a public land mobile network (PLMN) associated with the first network node. In some cases, the determining that the second radio access technology is unsupported by the first network node is based on a subscription of the UE with an operator having a relationship to a public land mobile network (PLMN) associated with the first network node.

The PLMN manager 730 may add a public land mobile network (PLMN) associated with the first network node to a list of PLMNs at which the second radio access technology is unsupported. In some examples, the PLMN manager 730 may add a public land mobile network (PLMN) associated with the first network node to a list of PLMNs at which the second radio access technology is unsupported. The rejection threshold manager 735 may receive, from the first network node, a threshold number of responses each including a rejection cause that is one of the set of preconfigured causes. In some examples, the rejection threshold manager 735 may receive an indication of the threshold number of responses after which the UE is to transmit the second request. In some examples, the rejection threshold manager 735 may receive, from the first network node, a threshold number of responses each including a rejection cause that is one of the set of preconfigured causes. In some examples, the rejection threshold manager 735 may receive an indication of the threshold number of responses after which the UE is to transmit the second request.

Figure 8:
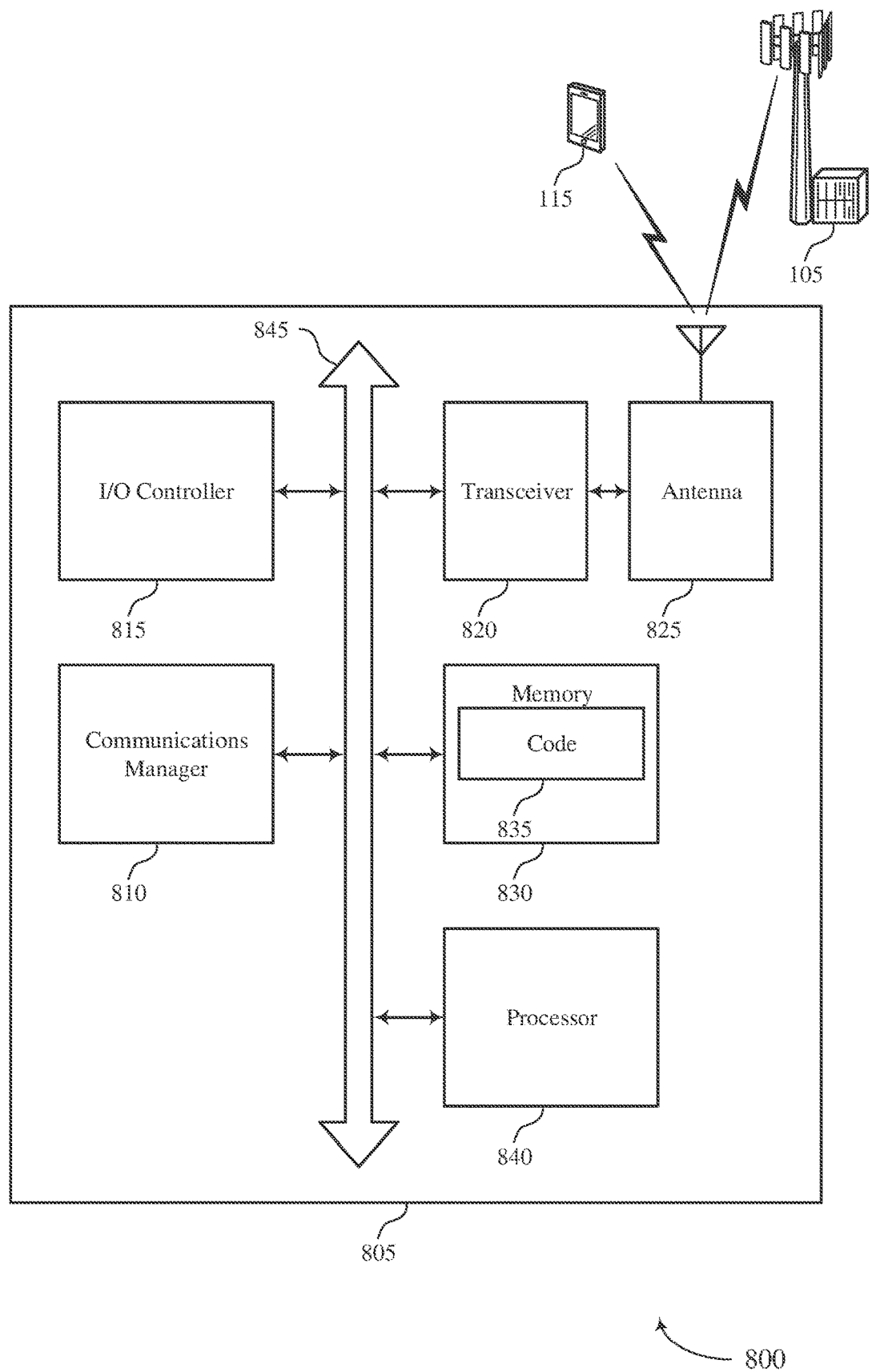
FIG. 8 shows a diagram of a system including a device that supports RAT switching based on network support in accordance with aspects of the present disclosure.

FIG. 8 shows a diagram of a system 800 including a device 805 that supports RAT switching based on network support in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may establish a connection with a base station according to the first radio access technology, transmit, to a first network node via the connection established with the base station, a first request associated with a bearer for a communication service, the first request including parameters associated with the second radio access technology, transmit, to the first network node based on the determining, a second request associated with the bearer for the communication service, the second request exclusive of the parameters associated with the second radio access technology, receive, from the first network node, a response indicating that the first request is rejected, the response including a rejection cause that is one of a set of preconfigured causes, and determine that the second radio access technology is unsupported by the first network node for communications with the UE based on the rejection cause being one of the set of preconfigured causes.

The communications manager 810 may also establish a first connection with a first base station according to the second radio access technology, establish, based on the determining, a second connection with the first base station or a second base station according to the first radio access technology, transmit, to a first network node via the first connection with the first base station, a first request associated with a bearer for a communication service, the first request including parameters associated with the second radio access technology, transmit, via the second connection with the first base station or the second base station, a second request associated with the bearer for the communication service to the first network node or a second network node, the second request exclusive of the parameters associated with the second radio access technology based on the determining, receive, from the first base station, a response indicating that the first request is rejected, the response including a rejection cause that is one of a set of preconfigured causes, and determine that the second radio access technology is unsupported by the first network node for communications with the UE based on the rejection cause being one of the set of preconfigured causes.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting RAT switching based on network support).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
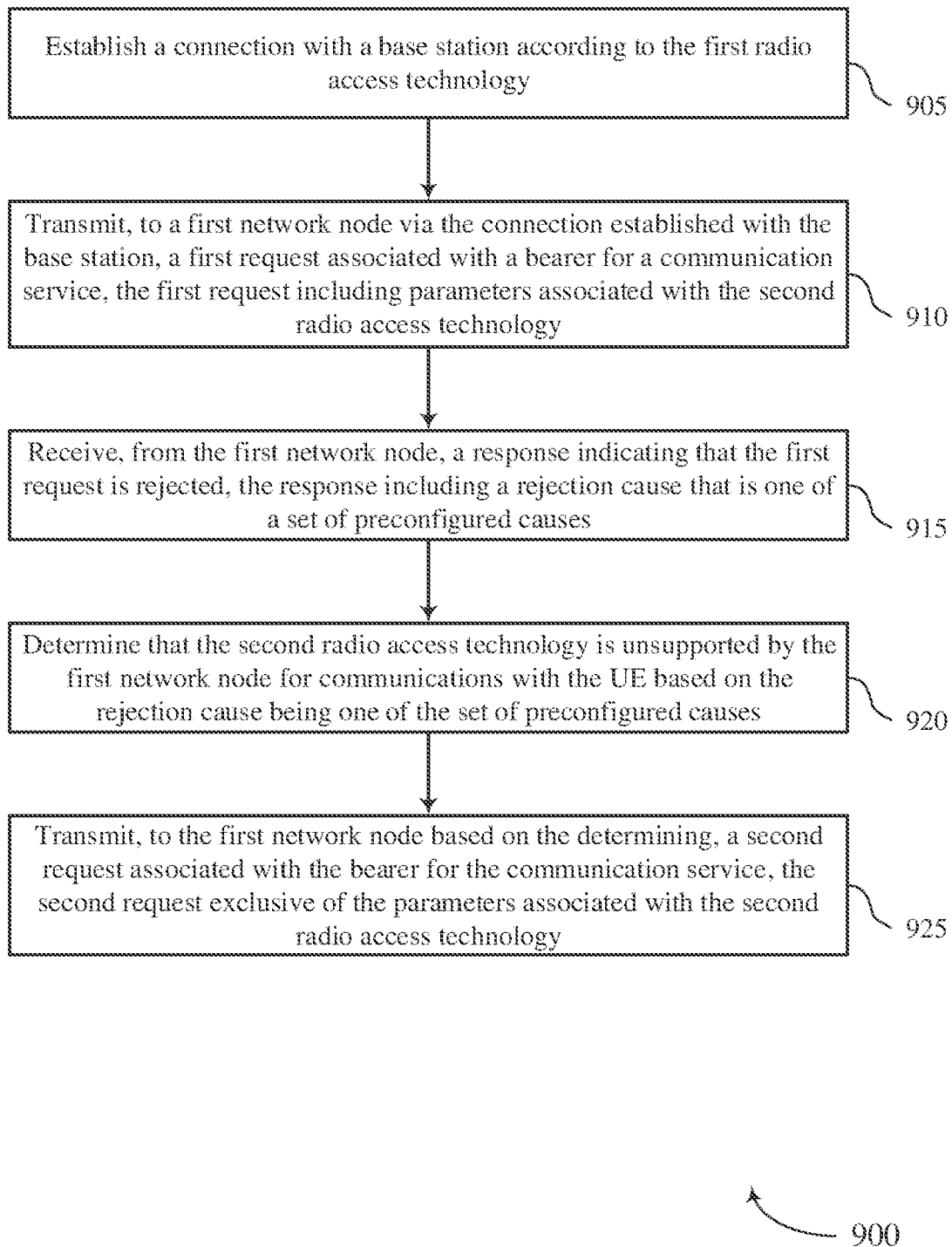
FIGS. 9 and 10 show flowcharts illustrating methods that support RAT switching based on network support in accordance with aspects of the present disclosure.

FIG. 9 shows a flowchart illustrating a method 900 that supports RAT switching based on network support in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 905, the UE may establish a connection with a base station according to the first radio access technology. The operations of 905 may be performed according to the methods described herein. In some examples, aspects of the operations of 905 may be performed by a connection manager as described with reference to FIGS. 5 through 8.

At 910, the UE may transmit, to a first network node via the connection established with the base station, a first request associated with a bearer for a communication service, the first request including parameters associated with the second radio access technology. The operations of 910 may be performed according to the methods described herein. In some examples, aspects of the operations of 910 may be performed by a request manager as described with reference to FIGS. 5 through 8.

At 915, the UE may receive, from the first network node, a response indicating that the first request is rejected, the response including a rejection cause that is one of a set of preconfigured causes. The operations of 915 may be performed according to the methods described herein. In some examples, aspects of the operations of 915 may be performed by a response manager as described with reference to FIGS. 5 through 8.

At 920, the UE may determine that the second radio access technology is unsupported by the first network node for communications with the UE based on the rejection cause being one of the set of preconfigured causes. The operations of 920 may be performed according to the methods described herein. In some examples, aspects of the operations of 920 may be performed by a RAT manager as described with reference to FIGS. 5 through 8.

At 925, the UE may transmit, to the first network node based on the determining, a second request associated with the bearer for the communication service, the second request exclusive of the parameters associated with the second radio access technology. The operations of 925 may be performed according to the methods described herein. In some examples, aspects of the operations of 925 may be performed by a request manager as described with reference to FIGS. 5 through 8.

Figure 10:
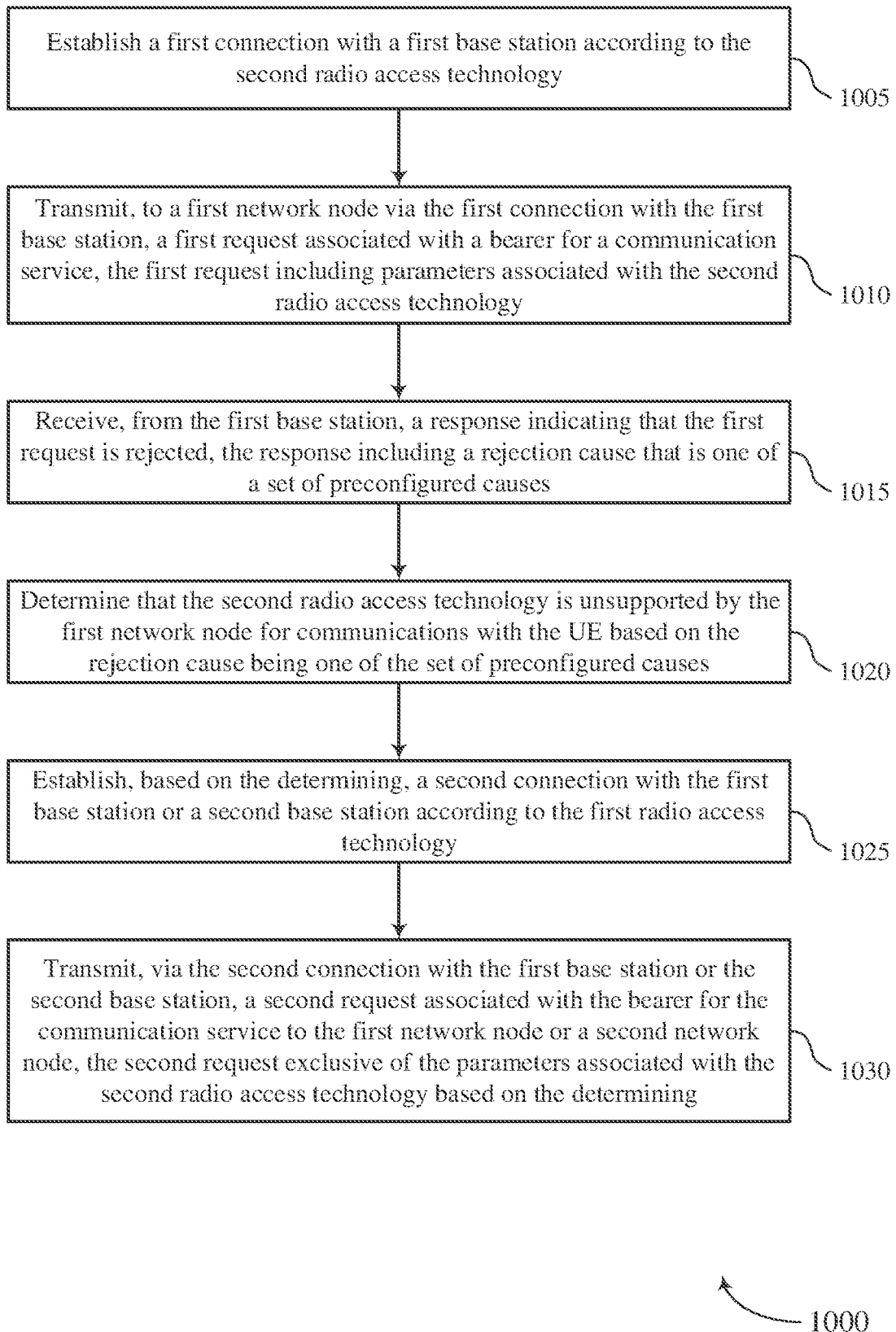

FIG. 10 shows a flowchart illustrating a method 1000 that supports RAT switching based on network support in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1005, the UE may establish a first connection with a first base station according to the second radio access technology. The operations of 1005 may be performed according to the methods described herein. In some examples, aspects of the operations of 1005 may be performed by a connection manager as described with reference to FIGS. 5 through 8.

At 1010, the UE may transmit, to a first network node via the first connection with the first base station, a first request associated with a bearer for a communication service, the first request including parameters associated with the second radio access technology. The operations of 1010 may be performed according to the methods described herein. In some examples, aspects of the operations of 1010 may be performed by a request manager as described with reference to FIGS. 5 through 8.

At 1015, the UE may receive, from the first base station, a response indicating that the first request is rejected, the response including a rejection cause that is one of a set of preconfigured causes. The operations of 1015 may be performed according to the methods described herein. In some examples, aspects of the operations of 1015 may be performed by a response manager as described with reference to FIGS. 5 through 8.

At 1020, the UE may determine that the second radio access technology is unsupported by the first network node for communications with the UE based on the rejection cause being one of the set of preconfigured causes. The operations of 1020 may be performed according to the methods described herein. In some examples, aspects of the operations of 1020 may be performed by a RAT manager as described with reference to FIGS. 5 through 8.

At 1025, the UE may establish, based on the determining, a second connection with the first base station or a second base station according to the first radio access technology. The operations of 1025 may be performed according to the methods described herein. In some examples, aspects of the operations of 1025 may be performed by a connection manager as described with reference to FIGS. 5 through 8.

At 1030, the UE may transmit, via the second connection with the first base station or the second base station, a second request associated with the bearer for the communication service to the first network node or a second network node, the second request exclusive of the parameters associated with the second radio access technology based on the determining. The operations of 1030 may be performed according to the methods described herein. In some examples, aspects of the operations of 1030 may be performed by a request manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE) supporting a first radio access technology and a second radio access technology, comprising:
    establishing a connection with a network device according to the first radio access technology;
    transmitting, to a first network node via the connection associated with the first radio access technology, a first request associated with a bearer for a communication service, the first request comprising parameters associated with the second radio access technology;
    receiving, from the first network node, a response indicating that the first request is rejected, the response comprising a rejection cause that is one of a set of preconfigured causes;
    determining that the second radio access technology is unsupported by the first network node for communications with the UE based at least in part on the rejection cause being one of the set of preconfigured causes; and
    transmitting, to the first network node based at least in part on the determining, a second request associated with the bearer for the communication service, the second request exclusive of the parameters associated with the second radio access technology.

2. The method of claim 1, further comprising:
    adding a public land mobile network (PLMN) associated with the first network node to a list of PLMNs at which the second radio access technology is unsupported; and
    refraining from transmitting requests comprising parameters associated with the second radio access technology to network nodes associated with the PLMN based at least in part on adding the PLMN to the list of PLMNs.

3. The method of claim 1, further comprising:
    receiving, from the first network node, a threshold number of responses each comprising a rejection cause that is one of the set of preconfigured causes; and
    transmitting, to the first network node, the second request exclusive of the parameters associated with the second radio access technology based at least in part on receiving the threshold number of responses.

4. The method of claim 3, further comprising:
    receiving an indication of the threshold number of responses after which the UE is to transmit the second request.

5. The method of claim 1, wherein determining that the second radio access technology is unsupported by the first network node is based at least in part on a subscription of the UE with an operator having a relationship to a public land mobile network (PLMN) associated with the first network node.

6. The method of claim 1, wherein the set of preconfigured causes comprise rejection causes for which handling at the UE is undefined.

7. The method of claim 1, wherein the set of preconfigured causes comprise one or more of a first cause indicating that the network device is unable to derive an identity of the UE, a second cause indicating that evolved packet system (EPS) services are not allowed in a public land mobile network (PLMN) associated with the first network node, and a third cause indicating a protocol error.

8. A method for wireless communication at a user equipment (UE) supporting a first radio access technology and a second radio access technology, comprising:
    establishing a first connection with a first network device according to the second radio access technology;
    transmitting, to a first network node via the first connection with the first network device, a first request associated with a bearer for a communication service, the first request comprising parameters associated with the second radio access technology;
    receiving, from the first network device, a response indicating that the first request is rejected, the response comprising a rejection cause that is one of a set of preconfigured causes;
    determining that the second radio access technology is unsupported by the first network node for communications with the UE based at least in part on the rejection cause being one of the set of preconfigured causes;
    establishing, based at least in part on the determining, a second connection with the first network device or a second network device according to the first radio access technology; and
    transmitting, via the second connection with the first network device or the second network device, a second request associated with the bearer for the communication service to the first network node or a second network node, the second request exclusive of the parameters associated with the second radio access technology based at least in part on the determining.

9. The method of claim 8, further comprising:
    adding a public land mobile network (PLMN) associated with the first network node to a list of PLMNs at which the second radio access technology is unsupported; and
    refraining from transmitting requests comprising parameters associated with the second radio access technology to network nodes associated with the PLMN based at least in part on adding the PLMN to the list of PLMNs.

10. The method of claim 8, further comprising:
    receiving, from the first network node, a threshold number of responses each comprising a rejection cause that is one of the set of preconfigured causes; and
    transmitting, to the first network node or the second network node, the second request comprising the parameters associated with the first radio access technology based at least in part on receiving the threshold number of responses.

11. The method of claim 10, further comprising:
    receiving an indication of the threshold number of responses after which the UE is to transmit the second request.

12. The method of claim 8, wherein the determining that the second radio access technology is unsupported by the first network node is based at least in part on a subscription of the UE with an operator having a relationship to a public land mobile network (PLMN) associated with the first network node.

13. The method of claim 8, wherein the set of preconfigured causes comprise rejection causes for which handling at the UE is undefined.

14. The method of claim 8, wherein the set of preconfigured causes comprise one or more of a first cause indicating that the first network device is unable to derive an identity of the UE, a second cause indicating that evolved packet system (EPS) services are not allowed in a public land mobile network (PLMN) associated with the first network node, and a third cause indicating a protocol error.

15. An apparatus for wireless communication at a user equipment (UE) supporting a first radio access technology and a second radio access technology, comprising:
  at least one processor; and
  memory coupled with the at least one processor, the memory storing instructions executable by the at least one processor to cause the UE to:
    establish a connection with a network device according to the first radio access technology;
    transmit, to a first network node via the connection associated with the first radio access technology, a first request associated with a bearer for a communication service, the first request comprising parameters associated with the second radio access technology;
    receive, from the first network node, a response indicating that the first request is rejected, the response comprising a rejection cause that is one of a set of preconfigured causes;
    determine that the second radio access technology is unsupported by the first network node for communications with the UE based at least in part on the rejection cause being one of the set of preconfigured causes; and
    transmit, to the first network node based at least in part on the determining, a second request associated with the bearer for the communication service, the second request exclusive of the parameters associated with the second radio access technology.

16. The apparatus of claim 15, wherein the instructions are further executable by the at least one processor to cause the apparatus to:
  add a public land mobile network (PLMN) associated with the first network node to a list of PLMNs at which the second radio access technology is unsupported; and
  refrain from transmitting requests comprising parameters associated with the second radio access technology to network nodes associated with the PLMN based at least in part on adding the PLMN to the list of PLMNs.

17. The apparatus of claim 15, wherein the instructions are further executable by the at least one processor to cause the apparatus to:
  receive, from the first network node, a threshold number of responses each comprising a rejection cause that is one of the set of preconfigured causes; and
  transmit, to the first network node, the second request exclusive of the parameters associated with the second radio access technology based at least in part on receiving the threshold number of responses.

18. The apparatus of claim 17, wherein the instructions are further executable by the at least one processor to cause the apparatus to:
  receive an indication of the threshold number of responses after which the UE is to transmit the second request.

19. The apparatus of claim 15, wherein determining that the second radio access technology is unsupported by the first network node is based at least in part on a subscription of the UE with an operator having a relationship to a public land mobile network (PLMN) associated with the first network node.

20. The apparatus of claim 15, wherein the set of preconfigured causes comprise rejection causes for which handling at the UE is undefined.

21. The apparatus of claim 15, wherein the set of preconfigured causes comprise one or more of a first cause indicating that the network device is unable to derive an identity of the UE, a second cause indicating that evolved packet system (EPS) services are not allowed in a public land mobile network (PLMN) associated with the first network node, and a third cause indicating a protocol error.

22. The apparatus of claim 15, wherein the first request and second request comprise attach requests or tracking area update requests.

23. An apparatus for wireless communication at a user equipment (UE) supporting a first radio access technology and a second radio access technology, comprising:
  at least one processor; and
  memory coupled with the at least one processor, the memory storing instructions executable by the at least one processor to cause the UE to:
    establish a first connection with a first network device according to the second radio access technology;
    transmit, to a first network node via the first connection with the first network device, a first request associated with a bearer for a communication service, the first request comprising parameters associated with the second radio access technology;
    receive, from the first network device, a response indicating that the first request is rejected, the response comprising a rejection cause that is one of a set of preconfigured causes;
    determine that the second radio access technology is unsupported by the first network node for communications with the UE based at least in part on the rejection cause being one of the set of preconfigured causes;
    establish, based at least in part on the determining, a second connection with the first network device or a second network device according to the first radio access technology; and
    transmit, via the second connection with the first network device or the second network device, a second request associated with the bearer for the communication service to the first network node or a second network node, the second request exclusive of the parameters associated with the second radio access technology based at least in part on the determining.

24. The apparatus of claim 23, wherein the instructions are further executable by the at least one processor to cause the apparatus to:
  add a public land mobile network (PLMN) associated with the first network node to a list of PLMNs at which the second radio access technology is unsupported; and
  refrain from transmitting requests comprising parameters associated with the second radio access technology to network nodes associated with the PLMN based at least in part on adding the PLMN to the list of PLMNs.

25. The apparatus of claim 23, wherein the instructions are further executable by the at least one processor to cause the apparatus to:

receive, from the first network node, a threshold number of responses each comprising a rejection cause that is one of the set of preconfigured causes; and transmit, to the first network node or the second network node, the second request comprising the parameters associated with the first radio access technology based at least in part on receiving the threshold number of responses.

26. The apparatus of claim 25, wherein the instructions are further executable by the at least one processor to cause the apparatus to:

receive an indication of the threshold number of responses after which the UE is to transmit the second request.

27. The apparatus of claim 23, wherein the determining that the second radio access technology is unsupported by the first network node is based at least in part on a subscription of the UE with an operator having a relationship to a public land mobile network (PLMN) associated with the first network node.

28. The apparatus of claim 23, wherein the set of preconfigured causes comprise rejection causes for which handling at the UE is undefined.

29. The apparatus of claim 23, wherein the set of preconfigured causes comprise one or more of a first cause indicating that the first network device is unable to derive an identity of the UE, a second cause indicating that evolved packet system (EPS) services are not allowed in a public land mobile network (PLMN) associated with the first network node, and a third cause indicating a protocol error.

30. The apparatus of claim 23, wherein the first request and second request comprise attach requests or tracking area update requests.

\* \* \* \* \*